United States Patent
Lewis et al.

(10) Patent No.: US 8,677,114 B2
(45) Date of Patent: Mar. 18, 2014

(54) APPLICATION STEERING AND APPLICATION BLOCKING OVER A SECURE TUNNEL

(75) Inventors: Adam C. Lewis, Buffalo Grove, IL (US); George Popovich, Palatine, IL (US); Peter E. Thomas, Schaumburg, IL (US)

(73) Assignee: Motorola Solutions, Inc., Schaumburg (IL)

( * ) Notice: Subject to any disclaimer, the term of this patent is extended or adjusted under 35 U.S.C. 154(b) by 1186 days.

(21) Appl. No.: 11/619,878

(22) Filed: Jan. 4, 2007

(65) Prior Publication Data
US 2008/0165964 A1 Jul. 10, 2008

(51) Int. Cl.
*H04L 9/00* (2006.01)
*H04L 29/06* (2006.01)

(52) U.S. Cl.
CPC .......... *H04L 63/0485* (2013.01); *H04L 63/04* (2013.01)
USPC ............... 713/153; 726/11; 726/14; 713/150; 713/151

(58) Field of Classification Search
USPC ................................ 726/2–6, 10, 11; 713/153
See application file for complete search history.

(56) References Cited

U.S. PATENT DOCUMENTS

| | | | |
|---|---|---|---|
| 7,562,213 B1 * | 7/2009 | Timms | 713/160 |
| 7,574,603 B2 | 8/2009 | Swander et al. | |
| 7,779,461 B1 * | 8/2010 | Liu et al. | 726/15 |
| 2002/0161905 A1 | 10/2002 | Haverinen | |
| 2003/0233568 A1 * | 12/2003 | Maufer et al. | 713/200 |
| 2004/0015724 A1 | 1/2004 | Pham | |
| 2005/0009501 A1 | 1/2005 | Kekki | |
| 2005/0088977 A1 * | 4/2005 | Roch et al. | 370/254 |
| 2006/0168213 A1 | 7/2006 | Richardson | |
| 2007/0011448 A1 * | 1/2007 | Chhabra et al. | 713/151 |
| 2007/0147320 A1 * | 6/2007 | Sattari et al. | 370/338 |
| 2008/0162924 A1 * | 7/2008 | Chinitz et al. | 713/153 |

FOREIGN PATENT DOCUMENTS

WO  WO 2006046896 A1 * 5/2006

OTHER PUBLICATIONS

PCT Search Report Dated Aug. 29, 2008.

* cited by examiner

*Primary Examiner* — Ashok Patel
*Assistant Examiner* — Alexander Lagor
(74) *Attorney, Agent, or Firm* — Randi L. Karpinia; Daniel R. Bestor

(57) ABSTRACT

Techniques are provided for enabling application steering/blocking in a secure network which includes a network entity, and a first tunnel endpoint coupled to the network entity over an encrypted tunnel. The first tunnel endpoint associates at least a first Security Parameter Index (SPI) to a first application identifier to generate first mapping information (MI), communicates the first MI to the network entity, and transmits an encrypted message to the network entity over the encrypted tunnel. The encrypted message includes an encrypted packet and an unencrypted header including the first SPI. The network entity determines the first SPI from the unencrypted header, determines the first application identifier based on the first SPI and the first MI, and identifies a first application associated with the first application identifier. The network entity can still perform application steering/blocking even though traffic passing through the tunnel is encrypted.

29 Claims, 7 Drawing Sheets

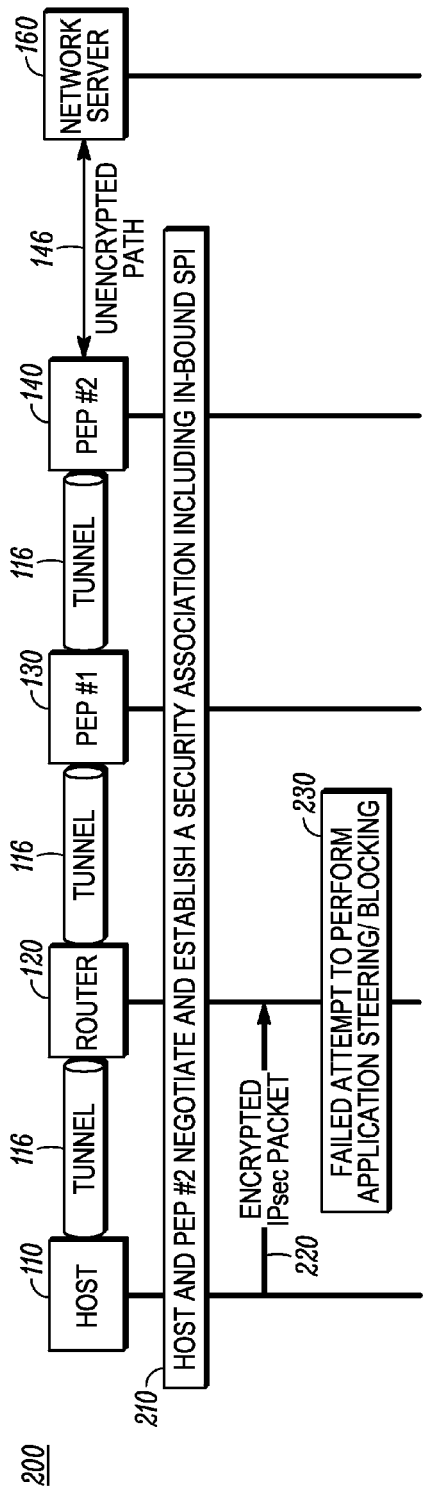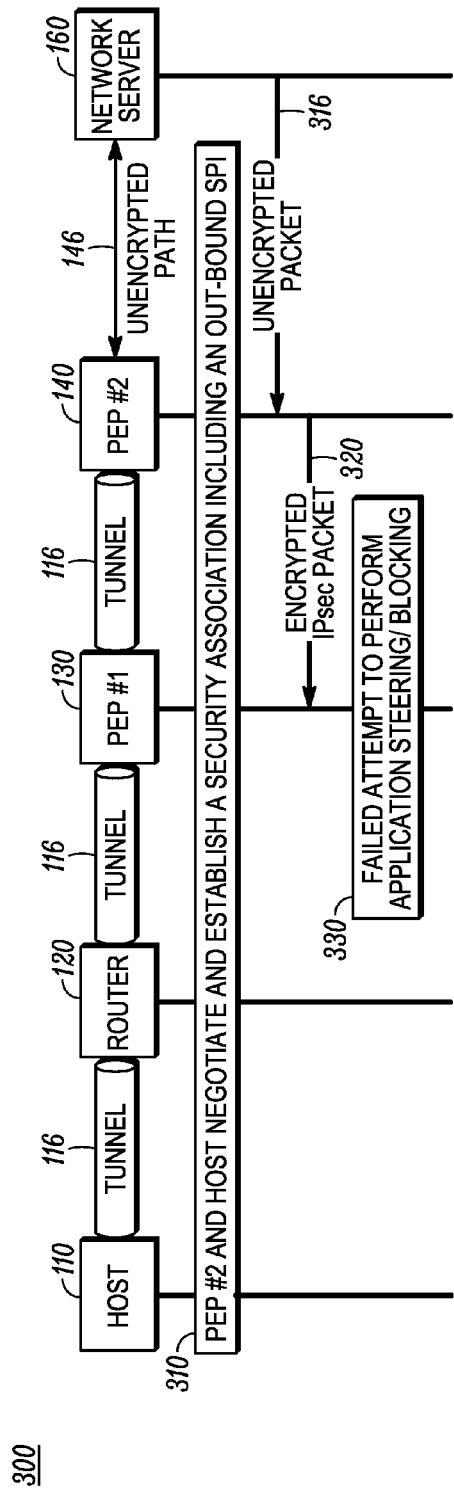

APPLICATION STEERING AND APPLICATION BLOCKING OVER A SECURE TUNNEL

FIELD OF THE INVENTION

The present invention relates generally to secure communications and more particularly to application steering and/or application blocking in secure networks.

BACKGROUND

Computer networks can include a number of different network entities such as nodes, access points, intermediate servers, application servers, and the like. In such networks, many of the network entities are capable of communicating over any one of a number of different communication interfaces. Accordingly, it is beneficial to use such communication interfaces in a manner which maximizes network resource utilization.

To efficiently use different network resources, usage policies can be implemented in at least some of the network entities with respect to the usage of certain interfaces. For example, application steering and blocking policies can be implemented which help to define permissible usage of the various interfaces based on one or more user defined policies which may include, for example, the billing structures, the relative ranking of a particular user, the type of application, the Quality of Service (QoS) requirements of the application, and the like.

Application steering policies can specify which of the particular interface(s) and/or link(s) are available for communicating to or from a network entity that is running a particular type of application. These application steering policies are designed to allow or encourage the sending of packets associated with a particular application over certain of the interfaces. Application blocking policies can also be defined which block or prevent particular interface(s) and/or link(s) from being used to send packets which originate from a particular application. These application blocking policies are designed to prevent or discourage the use of certain interfaces (and their corresponding links) for communicating packets associated with a particular application based on the requirements of the particular application. For example, in a network entity which has an 802.11 interface and a cellular interface, a policy could specify that traffic associated with a video application should only use an 802.11 interface and an 802.11 link, while traffic associated with a voice application can use either the cellular interface and a cellular link or the 802.11 interface. Thus, by implementing application steering and/or blocking policies at different network entities throughout the network, certain applications can be required to use particular interfaces (and corresponding links) for communication.

In port-based application steering/blocking, an application steering/blocking module can examine an upper layer identifier, such as a port number or Internet Protocol (IP) field, in a particular data packet to determine how to steer/block the data packet. For example, a network entity can determine which application a data packet is associated with by examining the port number associated with the data packet. Once the network entity knows the particular application the data packet is associated with, the network entity can then determine, per its steering/blocking policy, which interface(s) and corresponding link(s) should be used to communicate the data packet to other network entities in the network.

BRIEF DESCRIPTION OF THE FIGURES

The accompanying figures, which together with the detailed description below are incorporated in and form part of the specification, serve to further illustrate various embodiments and to explain various principles and advantages all in accordance with the present invention.

FIG. 2 is a flow diagram showing an attempt to perform port-based application steering and/or port-based application blocking to an inbound communication in the exemplary communication network of FIG. 1;

FIG. 3 is a flow diagram showing an attempt to perform port-based application steering and/or port-based application blocking to an outbound communication in the exemplary communication network of FIG. 1;

Figure 1:
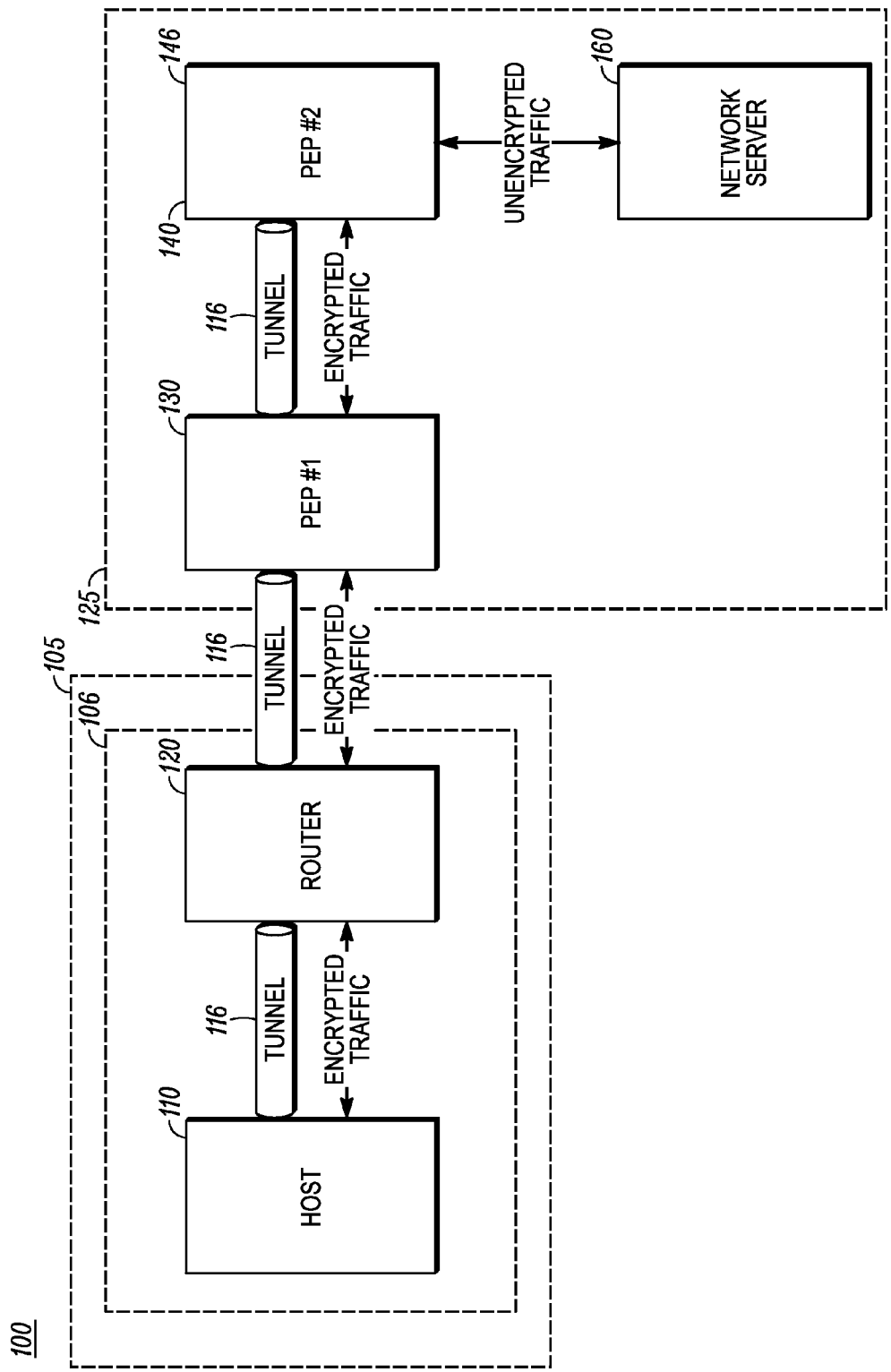
FIG. 1 is a block diagram of an exemplary communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to enabling application steering and application blocking in secure networks. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for enabling application steering and application blocking in secure networks as described herein. The non-processor circuits may include, but are not limited to, a radio receiver, a radio transmitter, signal drivers, clock circuits, power source circuits, and user input devices. As such, these functions may be interpreted as steps of a method for enabling application steering and application blocking in secure networks. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily designed to allow generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

FIG. 1 is a block diagram of an exemplary communication network 100 which comprises a mobile network 105 which includes a packet source 106 and a fixed network 125.

In this exemplary communication network 100, the packet source 106 is illustrated as a router 120 coupled to a host 110 computer. Although the packet source 106 is illustrated as a router coupled to a host computer, those of ordinary skill in the art will appreciate that the packet source 106 can be any node in a network which serves as a source of packets including for example, a mobile computer, wireless communication device, access point (AP), base station (BS), or other mobile Policy Enforcement Point (PEP). Those of ordinary skill in the art will also appreciate that the host 110 computer can be wirelessly coupled to the router 120 or wired to the router 120. The router 120 allows the host 110 computer to communicate with other network entities. It will be appreciated that this implementation is exemplary, and that aspects of the invention described herein could also be applied in a network where the router 120 and host 110 are implemented within a single node. The router 120 and host 110 can be fixed entities or potentially mobile.

The router 120 can generally be any one of a number of known devices designed to allow transmitting and/or receiving of packetized audio, video and/or data information as data packets. In some implementations, the router 120 can also be referred to as a Mobile Network Controller (MNC) or a mobile router.

The router 120 has interfaces to different networks and can communicate over any one of number of types of links. For example, the router 120 can have an interface which allows communication with IEEE 802.11 networks over a high bandwidth, low latency link, another interface which allows communication with a cellular network over a low bandwidth link, another interface which allows communication with a satellite network over a high bandwidth, low latency link, etc.

The router 120 supports application steering functionality and application blocking functionality. Application steering functionality allows policies to be defined at the router 120 which can be used to select a particular one or one(s) of its interfaces (and corresponding links) to send packets over based on requirements of the particular type of application that is running on the host 1110. Application blocking functionality allows policies to be defined at the router 120 which can be used to prevent the router 120 from sending packets over a particular one or ones of its interfaces (and corresponding links) based on the requirements of the particular type of application that is running on the host 110. Application steering and blocking is usually performed based on a transport layer port number (e.g., a Transmission Control Protocol (TCP) or User Datagram Protocol (UDP) port number).

The router 120 is coupled to the network 125 that can provide one or more sources of audio, video and/or data information. Depending on the implementation, the router 120 can be coupled to the network 125 via a wired or wireless connection, and can be fixed or mobile. In addition, the router 120 can move within communication range or coverage areas of different access points (APs).

The host 110 can be any machine which manipulates data according to a list of instructions (e.g., a program). The host 110 can include, for example, a personal computer (PC), a laptop computer (LC) and a mobile computer (MC). Personal computers include, for example, desktop computers, laptop or notebook computers, personal digital assistants (PDAs), portable computers, tablet computers, wearable computers, and the like. Mobile computers encompass appliances such as cellular telephones or devices which comply with any known standard (either ratified or currently being negotiated). The host 110 can also be referred to as a visiting mobile node (VMN).

The router 120 can be directly coupled to the host 110 by a wired link (e.g., Ethernet cable) or by a wireless link. When the host 110 is directly coupled to the router 120 by a wired link (e.g., an Ethernet cable), the host is relatively fixed by the wired link.

The router 120 is coupled to an external network 125 which can include any of a number of different network entities. In this particular example, the network 125 comprises a first Policy Enforcement Point (PEP #1) 130, a second Policy Enforcement Point (PEP #2) 140, and a network or application server 160. It will be appreciated that the network 125 is for purposes of demonstrating how the invention can be applied to one exemplary network 125 configuration, and that fewer or additional network entities could be included as part of the network 125.

The exemplary network 125, for example, can be a Customer Enterprise Network (CEN). The exemplary network 125 comprises a first Policy Enforcement Point (PEP #1) 130, a second Policy Enforcement Point (PEP #2) 140, and a network application server (NAS) 160. It will be appreciated that in other implementations, there can be multiple NASs, and that each NAS could be in a different network. It will be appreciated that in other implementations, one or more of the PEPs could be in a different network.

The first Policy Enforcement Point (PEP #1) 130 is a server which performs functions including, but not limited to, for example, encryption functions, application steering functions, and application blocking functions. The first Policy Enforcement Point (PEP #1) 130 can be, for example, a mobile Virtual Private Network (VPN) and is some implementations can be a Multi-Net Mobility (MNM) server. The first Policy Enforcement Point (PEP #1) 130 also has at least one communication interface and can have a number of different communication interfaces, and can send packets over any one of a number of available wired or wireless communication links. The first Policy Enforcement Point (PEP #1) 130 may only have one interface, but is aware of the fact that the router 120 has multiple interfaces each with their own unique Internet Protocol (IP) address. As will be described in detail below, the first Policy Enforcement Point (PEP #1) 130 can enforce application blocking/steering policies for the router 120 because the first Policy Enforcement Point (PEP #1) 130 is aware of the mapping between IP address and interface that the router 120 is using. For instance, when the policy says video should go over a wireless local area network (WLAN) interface, the first Policy Enforcement Point (PEP #1) 130 sends the traffic to the IP address that the router 120 has identified as using WLAN. The links between the first Policy Enforcement Point (PEP #1) 130 and router can be called virtual interfaces.

The second Policy Enforcement Point (PEP #2) 140 is also a server which performs functions including, but not limited to, for example encryption functions, application steering functions, and application blocking functions, and can also be, for example, a mobile Virtual Private Network (VPN) and is in some implementations can be a Multi-Net Mobility (MNM) server. The second Policy Enforcement Point (PEP #2) 140 also performs Home Agent (HA) mobility tracking functions and Virtual Private Network (VPN) security functions. The second Policy Enforcement Point (PEP #2) 140 can also have at least one or a number of communication interfaces for communicating over different types of networks, and can send packets over any one of a number of available links.

In one implementation, a suite of protocols for securing Internet Protocol (IP) communications known as IP security (IPsec) can be used to encrypt and/or authenticate each IP packet in an upstream or downstream data stream. IPsec protocols operate at the network layer (e.g., layer 3 of the Open Systems Interconnection (OSI) reference model). Other Internet security protocols in widespread use, such as Secure Sockets Layer (SSL) and Transport Layer Security (TLS), operate from the transport layer up (OSI layers 4-7). This makes IPsec more flexible, as it can be used for protecting both TCP-based protocols and UDP-based protocols. IPsec was intended to provide either transport mode: end-to-end security of packet traffic in which the end-point computers do the security processing, or tunnel mode: portal-to-portal communications security in which security of packet traffic is provided to several machines (even to entire LANs) by a single node. Tunnel mode is typically used for network-to-network communications (secure tunnels between different routers) or host-to-network and host-to-host communications. In tunnel mode, the entire IP packet is encrypted. It is then encapsulated into a new IP packet for routing to operate properly.

When enhanced security is important in the network 100, a secure tunnel 116 can be implemented for communications between various network entities 110, 120, 130, 140. In this implementation, the secure tunnel 116 can be referred to as an Internet Protocol Security (IPsec) tunnel. The secure tunnel 116 extends from the host 110 to the second Policy Enforcement Point (PEP #2) 140. In particular, the secure tunnel 116 secures communications between the host 110, the router 120, the first Policy Enforcement Point (PEP #1) 130 and the second Policy Enforcement Point (PEP #2) 140. In other words, IPsec can be used as the security protocol for communications between: the host 110, the router 120, the first Policy Enforcement Point (PEP #1) 130 and the second Policy Enforcement Point (PEP #2) 140.

When a network entity transmits information in the secure tunnel 116, the data packets traveling in the secure tunnel 116 are encrypted. For example, the host 110 and the second Policy Enforcement Point (PEP #2) 140 can use IPsec to encrypt data packets before sending them out to other entities in the network 100. The original or inner packet header of the data packet is encrypted, and an outer IPsec Authentication Header (AH) or Encapsulating Security Payload (ESP) extension header that is added to the encrypted data packet and remains unencrypted. In IPsec transport mode, the original IP header remains unencrypted, and headers added by the transport layer and above are encrypted. In IPsec tunnel mode, the original IP header and any headers added by layers above the IP layer are encrypted. Tunnel mode adds an additional IP header.

FIG. 2 is a flow diagram 200 illustrating an attempt to perform port-based application steering and/or blocking to an inbound communication in the exemplary communication network of FIG. 1. As used herein, the term "inbound" refers to communications originating at a host 110 and being destined for the network application server 160.

At block 210, the host 110 computes or negotiates a security association (SA) directly with its second Policy Enforcement Point (PEP #2) 140 (e.g., its home server). In some implementations, the host 110 computes or negotiates a unique security association (SA) directly with its second Policy Enforcement Point (PEP #2) 140 (e.g., its home server) for each application (e.g., a security association for a web browsing application, another security association for an e-mail application, another security association for a video streaming application, etc.). Each SA comprises a set of security information the two entities share in order to support secure communication. In IPsec, the SA includes an in-bound (receiving) Security Parameter Index (SPI) and an out-bound (sending) Security Parameter Index (SPI). Each SPI defines an index that can be used to lookup a security policy that a given pair of endpoints should use to identify security parameters in combination with IP address. The SA can also include, for example, a type of tunnel the host 110 and second Policy Enforcement Point (PEP #2) 140 will use to communicate, an authentication protocol the host 110 and second Policy Enforcement Point (PEP #2) 140 will use, an encryption algorithm the host 110 and second Policy Enforcement Point (PEP #2) 140 will use.

In internetworking and computer network engineering, Request for Comments (RFC) documents are a series of memoranda encompassing new research, innovations, and methodologies applicable to Internet technologies. The Internet Engineering Task Force (IETF) adopts some of the proposals published in RFCs as Internet standards. For example, RFC 4301, titled "Security Architecture for the Internet Protocol," and dated December, 2005, specifies that the Security Parameter Index (SPI) is a 32-bit value selected by the receiving end of a Security Association (SA) to uniquely identify the SA. In a Security Association Database (SAD) entry for an outbound SA, the SPI is used to construct the packet's AH or ESP header. In an SAD entry for an inbound SA, the SPI is used to map traffic to the appropriate SA. A particular SPI maps to a particular port number. The SPI maps to an entry in the SAD. The SAD contains a number of selectors including the ports (if applicable to the protocol such as UDP and TCP). These ports (possibly a list or range of ports) are the only valid traffic that can use the SA bound to the SPI.

Before sending packets out to other network entities, the host 110 can run IPsec to encrypt a packet, and send the encrypted packet to the router 120 at message 220. The transport layer port number in the packet is also encrypted.

When the router 120 attempts to perform application steering and/or blocking, it fails as indicated at block 230 since the router 120 can not determine the application the packets are associated with. To explain further, because IPsec encrypts packets being sent over the secure tunnel 116, the router 120 is unable to read the transport layer port number (e.g., a TCP or UDP port number) from the encrypted data packet and can not perform application steering and/or blocking.

FIG. 3 is a flow diagram illustrating an attempt to perform port-based application steering and/or port-based application blocking to an outbound communication in the exemplary communication network of FIG. 1. As used herein, the term "outbound" refers to communications originating at a network application server 160 and being destined for a host 110. At block 310, the host 110 computes or negotiates a security association (SA) directly with its second Policy Enforcement Point (PEP #2) 140 (e.g., its home server). When the network application server 160 wants to send a packet to the host 110, at message 316, the network application server 160 communicates the packet to the second Policy Enforcement Point (PEP #2) 140 over an unencrypted path 146. The second Policy Enforcement Point (PEP #2) 140 then encrypts the packet, and at message 320, communicates the encrypted packet to the first Policy Enforcement Point (PEP #1) 130 over a secure tunnel 116. When the first Policy Enforcement Point (PEP #1) 130 attempts to perform application steering/blocking at block 330, the first Policy Enforcement Point (PEP #1) 130 can not determine the particular application the encrypted packet is associated with since the packet is encrypted, and hence can not determine how to steer or block the encrypted packet.

When data packets are encrypted using IPsec, each data packet is encrypted. Each data packet includes a data payload portion and a packet header that are encrypted. The corresponding IPsec packet that is generated includes an IPsec header added to the encrypted data packet. The IPsec header is not encrypted. The IPsec header information includes the SPI(s) associated with a pair of node. As such, even though data packet has been encrypted, a network entity can still examine the IPsec header and determine the SPI(s) that are associated with the encrypted packet.

Figure 4:
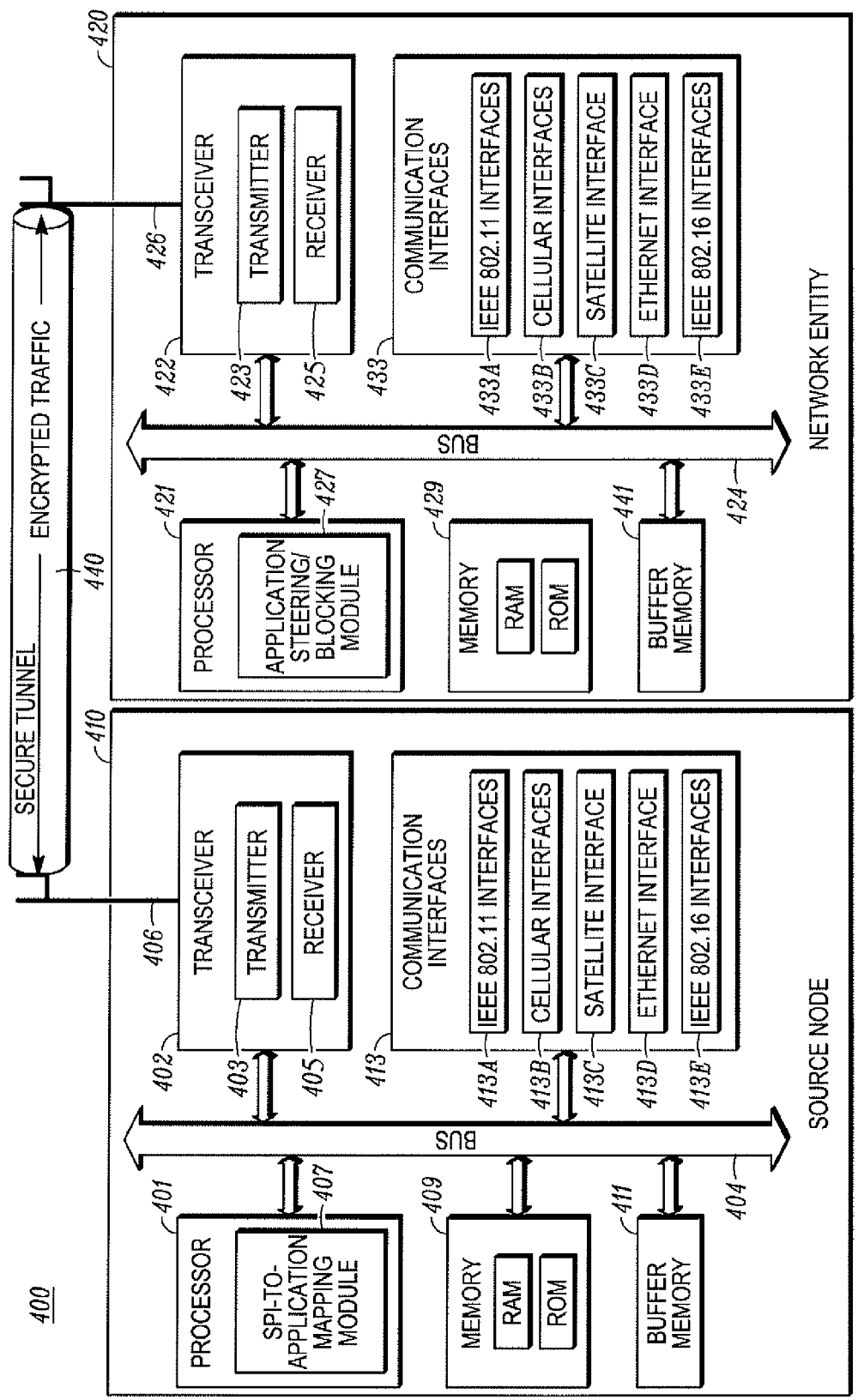
FIG. 4 is a block diagram of an exemplary communication network in accordance with some embodiments of the invention.

FIG. 4 is a block diagram of an exemplary communication network 400 in accordance with some embodiments of the invention. The exemplary communication network 400 comprises a source or transmitting node 410 designed to communicate with a network entity 420 over a secure IPsec tunnel 440. Data packets which are communicated over the secure IPsec tunnel 440 are encrypted.

The exemplary source or transmitting node 410 comprises a processor 401 including a Security Parameter Index (SPI)-to-application mapping module 407, a transceiver 402 including transmitter circuitry 403 and receiver circuitry 405, an antenna 406, a program memory 409 for storing operating instructions that are executed by the processor 401, a buffer memory 411, and a plurality of communication interfaces 413A-E. The node 410 is preferably an integrated unit containing at least all the elements depicted in FIG. 4, as well as any other elements necessary for the node 410 to perform its particular functions. Alternatively, the node 410 may comprise a collection of appropriately interconnected units or devices, wherein such units or devices perform functions that are equivalent to the functions performed by the elements of the node 410. For example, the node 410 may be implemented as a computer with a wireless local area network (WLAN) card.

The processor 401 can include one or more microprocessors, microcontrollers, DSPs (digital signal processors), state machines, logic circuitry, or any other device or devices that process information based on operational or programming instructions. Such operational or programming instructions are preferably stored in the program memory 409. The program memory 409 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 401 has one or more of its functions performed by a state machine or logic circuitry, the memory 409 containing the corresponding operational instructions may be embedded within the state machine or logic circuitry. The operations performed by the processor 401 and the rest of the node 410 are described in detail below.

The communication interfaces 413A-E can each have their own transceiver, but for sake of simplicity the transceivers for all of the communication interfaces 413A-E are shown in transceiver block 402. The transmitter circuitry 403 and the receiver circuitry 405 enable the node 400 to communicate information packets to and acquire information packets from the other nodes or network entities within the communication network over the secure IPsec tunnel 440. In this regard, the transmitter circuitry 403 and the receiver circuitry 405 include circuitry to enable digital or analog transmissions over a secure communication channel.

The implementations of the transmitter circuitry 403 and the receiver circuitry 405 depend on the implementation of the node 410. For example, the transmitter circuitry 403 and the receiver circuitry 405 can be implemented as an appropriate modem, or as conventional transmitting and receiving components of communication devices. The modem can be internal to the node 410 or insertable into the node 410 (e.g., embodied in a wireless a radio frequency (RF) modem implemented on a Personal Computer Memory Card International Association (PCMCIA) card). For a wireless communication device, the transmitter circuitry 403 and the receiver circuitry 405 are preferably implemented as part of the wireless device hardware and software architecture in accordance with known techniques. Most, if not all, of the functions of the transmitter circuitry 403 and/or the receiver circuitry 405, as well as the communication interfaces 413 can be implemented in a processor, such as the processor 401. However, the processor 401, the transmitter circuitry 403, the receiver circuitry 405, the communication interfaces 413 have been artificially partitioned herein to facilitate a better understanding.

In some implementations, the receiver circuitry 405 is capable of receiving radio frequency (RF) signals from at least one frequency bandwidth and optionally more than one frequency bandwidth, if the communications with the proximate device are in a frequency band other than that of the network communications. The transceiver 402 includes at least one set of transmitter circuitry 403. The at least one transmitter 403 may be capable of transmitting to multiple devices over multiple frequency bands. As with the receiver 405, multiple transmitters 403 may optionally be employed. In one implementation, one transmitter can be used for the transmission to a proximate node or direct link establishment to WLAN's, and other transmitters can be used for transmission to a cellular base station(s).

The antenna 406 comprises any known or developed structure for radiating and receiving electromagnetic energy in the frequency range containing the wireless communication frequencies. It will be appreciated that in some non-wireless implementations, the source node 410 and/or the network entity will not necessarily require an antenna 406

The buffer memory 411 can be any form of volatile memory, such as RAM, and is used for temporarily storing received information packets.

The communication interfaces 413A-E can each operate over a different protocol or radio protocol in a different frequency bandwidth. The communication interfaces 413A-E each have their own transceiver, but for sake of simplicity the transceivers for all of the communication interfaces 413A-E are shown in block 402. The transmitter circuitry 403 and the receiver circuitry 405 are designed to operate over any of the communication interfaces described herein. Each of these communication interfaces 413A-E can support certain bandwidth requirements, communication range requirements, etc. Each communication interface 413A-E operates at a data rate (or one of a set of data rates), and operates in a frequency band (or one of a set of frequency bands) having a bandwidth. The communication interfaces generate a modulated data stream, and can demodulate data using at least one demodulation technique to generate a demodulated data stream.

The first communication interface 413A can be, for example, an ad hoc networking air interface, and in this exemplary embodiment is shown as an IEEE 802.11 WLAN communication interface which complies with any of the IEEE 802.11 Standards and specifications (e.g., IEEE 802.11 (a), (b), or (g)).

The second communication interface 413B is shown as a cellular communication interface. The cellular air interface 413B can utilize any one of a number of different multiple access techniques such as Frequency Division Multiplexing (FDM), Time Division Multiplexing (TDM), Code Division Multiplexing (CDM), and others. Examples of multiple access schemes which can be used in the network can include any one or more of time division multiple access (TDMA), direct sequence or frequency hopping code division multiple access (CDMA), Global System for Mobile communication (GSM), Wide-band CDMA (WCDMA), Universal Mobile Telecommunications System (UMTS), frequency division multiple access (FDMA), orthogonal frequency division multiplexing (OFDM), opportunity division multiple access (ODMA), a combination of any of the foregoing multiple access technologies, a multiple access technology in which portions of the frequency spectrum to be used are determined by local signal quality measurements and in which multiple portions of the frequency spectrum may be used simultaneously, or any other multiple access or multiplexing methodology or combination thereof. Moreover, the second communication interface 413B can utilize other radio air interfaces such as those used in Motorola Inc.'s Mesh Enabled Architecture (MEA) type radios and the like. In general, the second communication interface 413B can support communication in compliance with at least the following communication standards: (1) the "Telecommunications Industry Association (TIA)/Electronic Industries Alliance (EIA)-95-B Mobile Station-Base Station Compatibility Standard for Dual-Mode Wideband Spread Spectrum Cellular System" (referred to herein as the IS-95 standard) which can be found at the following URL: http://www.tiaonline.org/, (2) the "TIA/EIA-98-D Recommended Minimum Standard for Dual-Mode Wideband Spread Spectrum Cellular Mobile Station" (the IS-98 standard) which can be found at the following URL: http://www.tiaonline.org/, (3) standards governed by a consortium named "3rd Generation Partnership Project" (3GPP) (referred to herein as the W-CDMA standard) which can be found at the following URL: http://www.3gpp.org/, (4) standards governed by a consortium named "3rd Generation Partnership Project 3" (3GPP2) (referred to herein as the cdma2000 standard) which can be found at the following URL: http://www.3gpp2.org/, (5) the high data rate (HDR) system that conforms to the TIA/EIA/IS-856 standard (the IS-856 standard) which can be found at the following URL: http://www.tiaonline.org/, and (6) other standards. These standards are incorporated herein by reference.

The third communication interface 413C is shown as a satellite communication interface. The fourth communication interface 413D is a frame-based computer networking interface, and in this exemplary implementation is shown as an IEEE 802.3 Ethernet interface 413D. The fifth communication interface 413E is shown as a communication interface which complies with IEEE 802.16 Standards. For example, fifth communication interface 413E can be a communication interface which complies with the IEEE 802.16e WiMax specifications. In some implementations, the fifth communication interface 413E can be, for example, an ultra wide band (UWB) communication interface which implements a Multiple Input Multiple Output (MIMO) communication interface which operates using Orthogonal Frequency Division Multiplexing (OFDM) modulation techniques or other modulation techniques. Alternatively, it will be appreciated that the fifth communication interface 413E can be a communication interface which complies with the IEEE 802.20 Mobile Broadband Wireless Access (MBWA) specifications for IP-based services.

It will be appreciated that the communication interfaces 413A-E are exemplary and that other types of communication interfaces (not shown) such as IEEE 802.15.3 communication interfaces, interfaces which implement any one of a number of data link layer (DLL) (or "Layer 2") technologies including, for example, the Institute of Electrical and Electronics Engineers (IEEE) 802.5 token ring, frame relay, packet over synchronous optical networking (SONET), Integrated Services Digital Network (ISDN), or other communication interfaces which operate according to any communication standard. Moreover, while the exemplary node 410 shows five communication interfaces 413A-E, it will be appreciated that in other practical implementations nodes could include only some of these communication interfaces or additional communication interfaces which are not shown.

As will be described in greater detail below, the processor 401 includes an Security Parameter Index (SPI)-to-application mapping module 407 which can map or associate each application identifier with an appropriate SPI to generate mapping information. The memory 409 designed to store the mapping information, where each mapping comprises a unique Security Parameter Index (SPI) for a particular application identifier. The transmitter 403 designed to transmit the particular mapping information to the network entity 420.

The network entity 420 comprises a processor 421 including an application steering/blocking module 427, a transceiver 422 including transmitter 423 and receiver 425, an antenna 426, a program memory 429 for storing operating instructions that are executed by the processor 421, a buffer memory 441, and a plurality of communication interfaces 433A-E. The functions of the various elements or modules within the network entity 420 will not be described in detail.

In the network entity 420, the receiver 425 can receive the particular mapping information from the node 410, and the memory 429 can store the particular mapping information for later use. As noted above, the particular mapping information comprises a particular Security Parameter Index (SPI) associated with a particular application identifier. It will be appreciated that the memory 429 can also store other mapping information it receives from the node 410 and/or from other network entities. The other mapping information comprises other SPIs associated with other application identifiers.

When the receiver 425 receives a message from the node 410 over the encrypted tunnel 430, it provides the message to the processor 421. At a minimum, the message would include an encrypted packet and its unencrypted IPsec header. The unencrypted IPsec header includes the particular SPI.

The processor 421 is designed to extract the particular SPI from the unencrypted IPsec header. Once the processor 421 has the particular SPI, the processor 421 can use the particular SPI and the particular mapping information to determine the particular application identifier associated with the particular SPI. Once the processor 421 knows the particular application identifier, the processor 421 can identify a particular application associated with the particular application identifier. Knowing that the encrypted packet is associated with the particular application, the application steering/blocking module 427 of the processor 421 can then perform application steering/blocking. In particular, based on the particular application, the application steering/blocking module 427 can select an appropriate one of its communication interfaces 433A-E to use to transmit the encrypted packet from the network entity 420 to another network entity.

Figure 5:
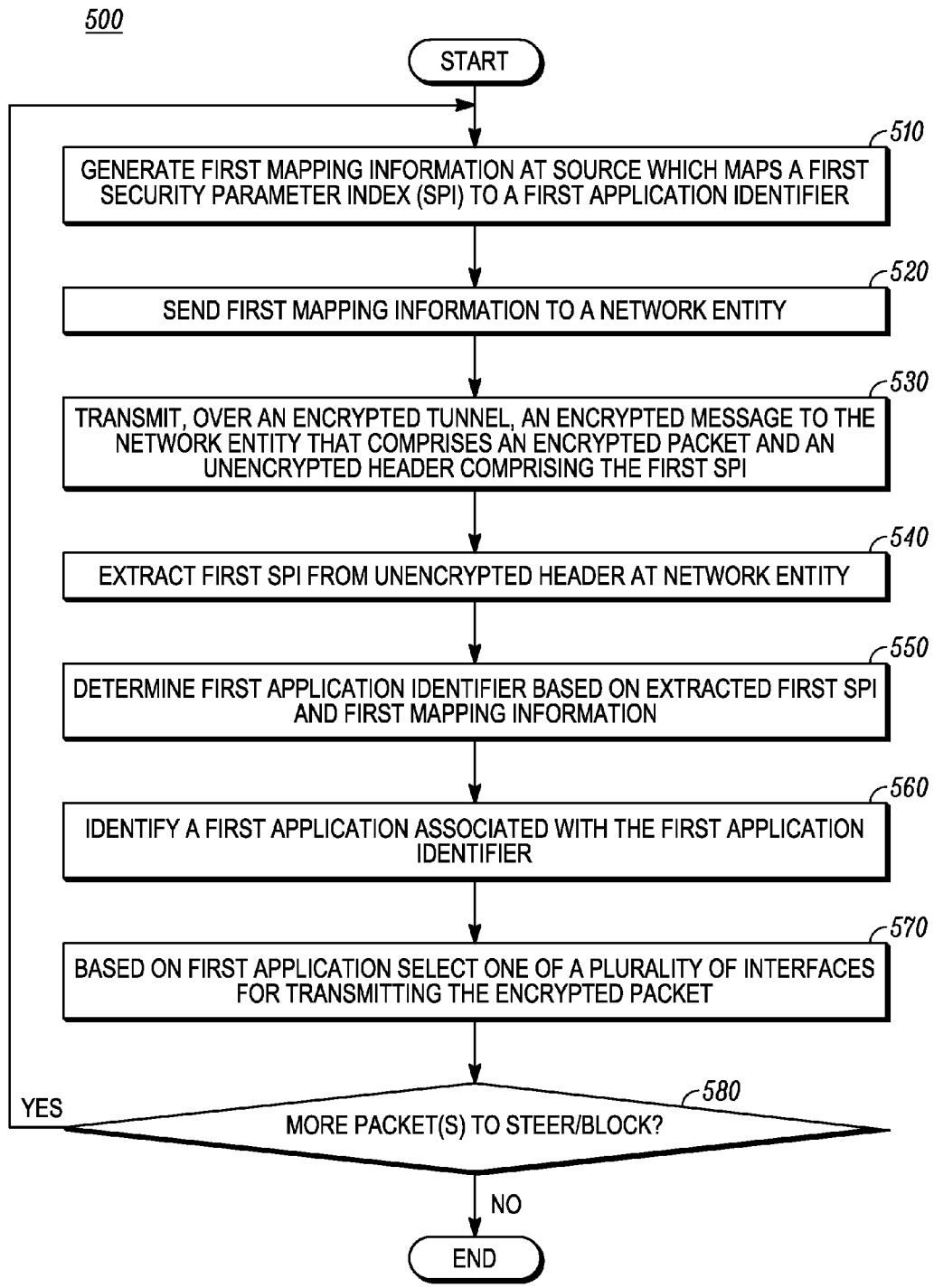
FIG. 5 is a flow chart illustrating an exemplary process for enabling application steering and/or application blocking in secure networks in accordance with some embodiments of the invention.

FIG. 5 is a flow chart illustrating an exemplary process 500 for enabling application steering and/or application blocking in secure networks in accordance with some embodiments of the invention. In the following example, it is assumed that a source node communicates with another network entity over a secure tunnel. In this context, the source node can be any network entity which transmits encrypted data packets to another network entity. The network entity which receives the encrypted data packets can be any network entity which has an application steering module and/or an application blocking module, or otherwise implements application steering and/or blocking functionality.

At step 510, the source node maps a particular Security Parameter Index (SPI) to a particular application identifier to generate particular mapping information, and at step 520, the source node communicates the particular mapping information to the network entity.

When the source node wants to transmit information over the secure or encrypted tunnel, at step 530, the source node can transmit a message to the network entity over the encrypted tunnel. In this example, the message comprises an encrypted packet and an unencrypted IPsec header which includes the particular SPI. Alternatively, the message can comprise a plurality of encrypted packets and their corresponding unencrypted IPsec headers, each of which include a respective SPI.

At step 540, when the network entity receives the message, the network entity can determine (e.g., extract) the particular SPI from the unencrypted IPsec header. At this point, the network entity also has the particular mapping information. At step 550, the network entity can use the particular SPI and the particular mapping information to determine the particular application identifier that is associated with the encrypted data packet. At step 560, the network entity can use the particular application identifier to identify a particular application associated with the particular application identifier.

The network entity has a plurality of communication interfaces. At step 570, the network entity can utilize its knowledge of the particular application to select one (or more) of the plurality of interfaces to use for transmitting the encrypted packet to another network entity. The network entity can select the selected interface according to an application steering policy and/or application blocking policy that is implemented at the network entity. At step 580, the network entity determines whether there are any more packets to steer or block. If not, the method ends. If so, the method returns to step 510.

In FIG. 5, the source node and the network entity can generally comprise any network entity. For example, the source node may comprise a mobile host, and the network entity may comprise a mobile router. Alternatively, the source node may comprise an application server or other network server, and the network entity may comprise a policy enforcement point or other server. To illustrate how the process 500 can be applied to one exemplary network in one exemplary scenario within that one exemplary network, examples will be described below with reference to FIGS. 6 and 7. In these particular examples, it is assumed that the network comprises a network similar to that shown in FIG. 1.

Exemplary Applications

In accordance with some embodiments of the invention, a tunnel endpoint can generate mapping information and communicate the mapping information to a network entity. It will be appreciated that a tunnel endpoint may comprise any entity that is a source or destination of traffic, and that the network entity can be any network entity between the tunnel endpoints which receives information from one of the tunnel endpoints. For example, any host, router, Policy Enforcement Point (PEP), or server that has any part of the mapping (e.g., either in-bound (receiving) mapping information or out-bound (sending) mapping information) can share that mapping with any or all of the entities at or between the tunnel endpoints. Specific implementations of this concept will now be described with respect to FIG. 6A where one of the tunnel endpoints is a host 602 and the network entity is a router 604, and with respect to FIG. 6B where one of the tunnel endpoints is Policy Enforcement Point (PEP #2) 608 and the network entity is Policy Enforcement Point (PEP #1) 607.

Figure 6A:
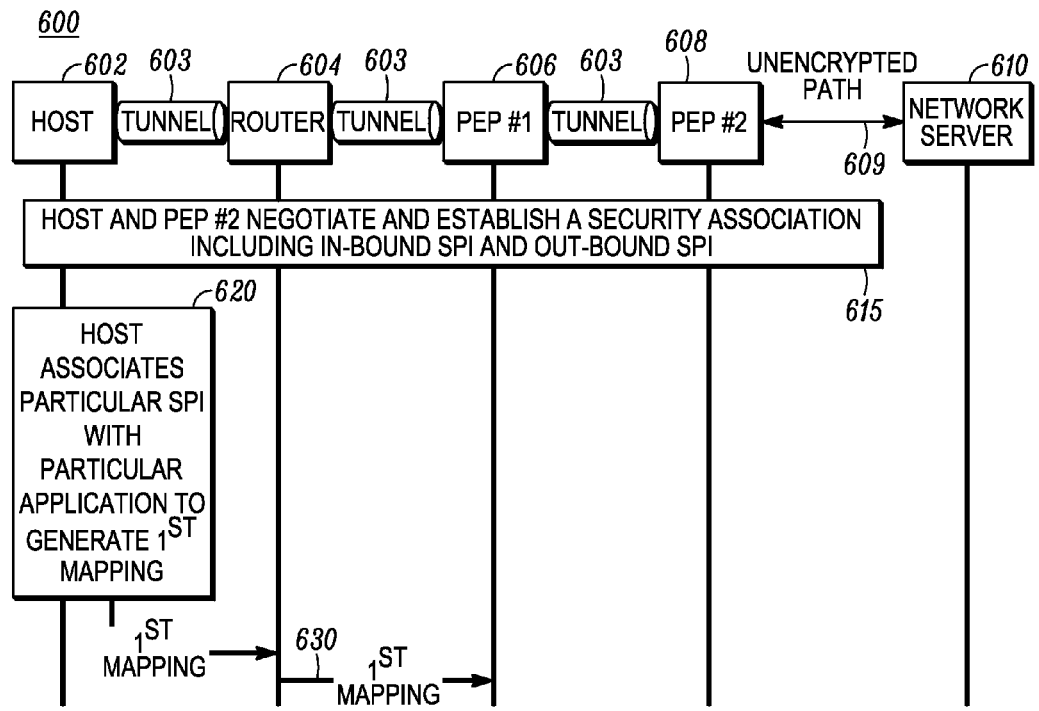
FIG. 6A is a message flow diagram illustrating an exemplary process for associating an inbound Security Parameter Index (SPI) and outbound SPI with an application and communicating mapping information to a network entity over a tunnel in accordance with some embodiments of the invention.

FIG. 6A is a message flow diagram illustrating an exemplary process 600 for associating an inbound Security Parameter Index (SPI) and an outbound SPI with an application and communicating mapping information to a network entity 604, 606 over a tunnel 603 in accordance with some embodiments of the invention. At block 615, the mobile host 602 establishes its SA with the second Policy Enforcement Point (PEP #2) 608. At block 620, the mobile host 602 associates or "maps" its in-bound (receiving) SPI to a particular application, and associates or maps its out-bound (sending) SPI to the particular application. The mobile host 602 then sends a message to the router 604 which specifies the mapping information (e.g., the mapping between the particular SPIs and the particular application). At message 630, the router 604 can optionally also send the mapping information to the first Policy Enforcement Point (PEP #1) 606.

Figure 6B:
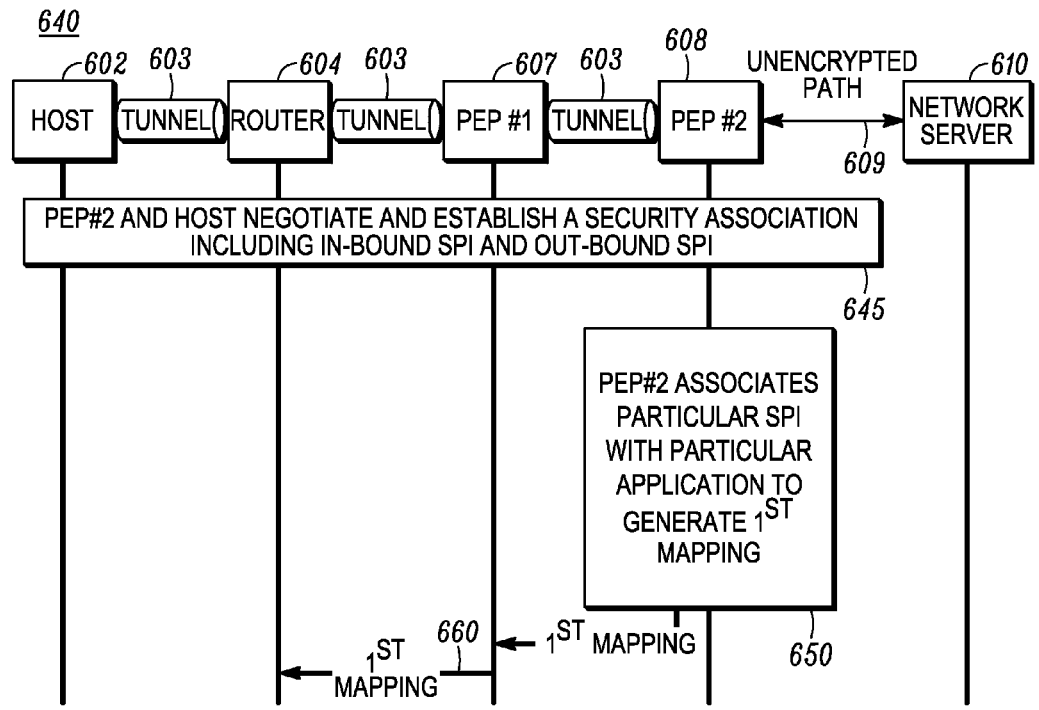
FIG. 6B is a message flow diagram illustrating an exemplary process for associating an inbound Security Parameter Index (SPI) and outbound SPI with an application and communicating mapping information to a network entity in accordance with some embodiments of the invention.

FIG. 6B is a message flow diagram illustrating an exemplary process 640 for associating an inbound Security Parameter Index (SPI) and outbound SPI with an application at a second tunnel endpoint 608 and communicating mapping information to network entities 604, 607 in accordance with some embodiments of the invention. At block 645, the second Policy Enforcement Point (PEP #2) 608 establishes its SA with the host 602 which includes keys for decrypting encrypted communications sent from the second Policy Enforcement Point (PEP #2) 608. At block 650, the second Policy Enforcement Point (PEP #2) 608 associates or "maps" in-bound (receiving) SPI to a particular application, and associates or "maps" out-bound (sending) SPI to the particular application, and sends a message to the first Policy Enforcement Point (PEP #1) 607 over the encrypted tunnel 603. This message specifies the mapping information (e.g., the mapping between the particular SPIs and the particular application). At message 660, the first Policy Enforcement Point (PEP #1) 606 then also sends the mapping information to the router 604.

In accordance with some embodiments of the invention, once mapping information has been provided to various network entities, when a first tunnel endpoint seeks to communicate information to another tunnel endpoint over an encrypted tunnel, at least one network entity which has the mapping information can use the information to steer/block encrypted traffic coming from the first tunnel endpoint. It will be appreciated that a first tunnel endpoint may comprise any entity that is a source of encrypted traffic being communicated over the encrypted tunnel, and that the second tunnel endpoint may comprise any entity that is a destination of the encrypted traffic. The network entity can be any network entity which receives information from a host which may be a tunnel endpoint in some implementations. Specific implementations of this concept will now be described with respect to FIG. 7 where the first tunnel endpoint is a host 702 and the network entity is a router 704 which steers/blocks encrypted inbound traffic through tunnel 703, and with respect to FIG. 8 where the first tunnel endpoint is a policy enforcement point (PEP#2) 808 and the network entity is a first Policy Enforcement Point (PEP #1) 807 which steers/blocks encrypted outbound traffic through tunnel 803.

Figure 7:
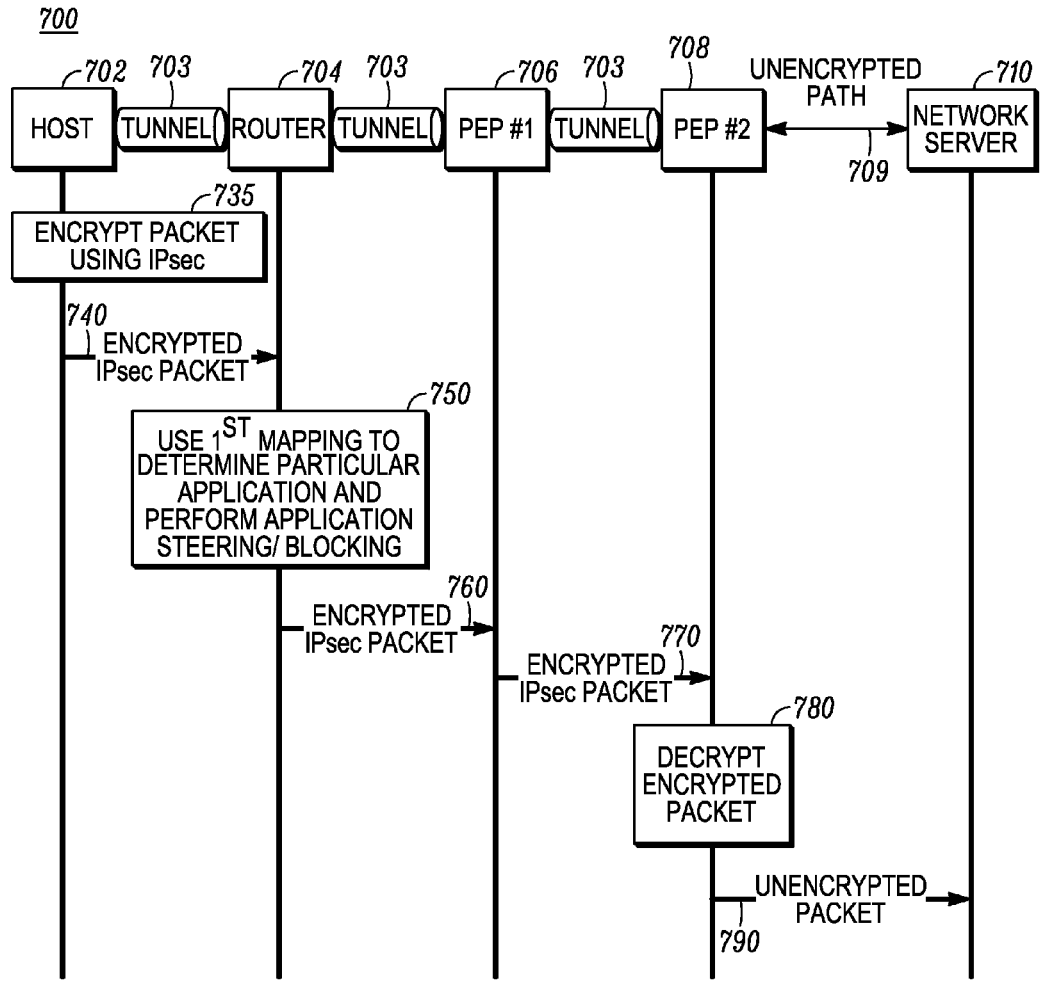
FIG. 7 is a message flow diagram illustrating an exemplary process for enabling application steering and/or application blocking to an inbound communication in secure networks in accordance with some embodiments of the invention.

FIG. 7 is a flow diagram illustrating an exemplary process 700 for enabling application steering and/or application blocking to an encrypted inbound communication in secure networks in accordance with some embodiments of the invention. In this particular example, it is assumed that the mobile host 702 is transmitting packets to the network application server 710. In process 700, a router 704 wants to perform application steering/blocking on encrypted inbound packets sent from the host 702 to the network application server 710. As will be described below, packet(s) communicated from the host 702 are encrypted between the host 702 and a policy enforcement point (PEP#2) 708. The router 704 applies its application steering/routing policies to the encrypted packets which originate at the mobile host 702.

When the mobile host 702 wants to transmit a packet in the inbound direction to another network entity (i.e., the network application server 710), at block 735, the mobile host 702 will encrypt the packet and append an IPsec header to the encrypted packet. At message 740, the mobile host 702 transmits the IPsec packet to the router 704. The IPsec packet comprises an unencrypted IPsec header appended to the encrypted packet.

At this point, it can be assumed that the router 704 has the mapping information which it obtains from, for example, either the host 702 and/or the first Policy Enforcement Point (PEP #1) 706. When the router 704 receives the IPsec packet, at block 750, the router 704 can examine the unencrypted IPsec header, determine the SPI from the unencrypted IPsec header, and use the mapping information and the SPI to determine the application (or application identifier) that the encrypted packet is associated with since the IPsec header, which includes the SPI, is not encrypted. Because the router 704 can determine the particular application the encrypted packet is associated with, the router 704 can perform its application steering/blocking policies.

Using conventional techniques, this determination could not happen since the port number is part of the encrypted packet and is therefore also encrypted (e.g., the router 704 can not rely on the port number to perform application steering/blocking).

The router 704 transmits or forwards the IPsec packet to the first Policy Enforcement Point (PEP #1) 706 at message 760, and the particular Policy Enforcement Point (PEP #1) 706 receives the IPsec packet. At message 770, the first Policy Enforcement Point (PEP #1) 706 can transmit the IPsec packet to the second Policy Enforcement Point (PEP #2) 708 based on the IP destination address contained in the unencrypted IPsec header.

When the second Policy Enforcement Point (PEP #2) 708 receives the IPsec packet from the first Policy Enforcement Point (PEP #1) 706, at block 780, the second Policy Enforcement Point (PEP #2) 708 uses keys it shares with the host 702 (e.g., established at block 615) to decrypt the encrypted packet, and at message 790, retransmits the unencrypted packet (which is originally sourced from the mobile host 702) to the network server 710.

Figure 8:
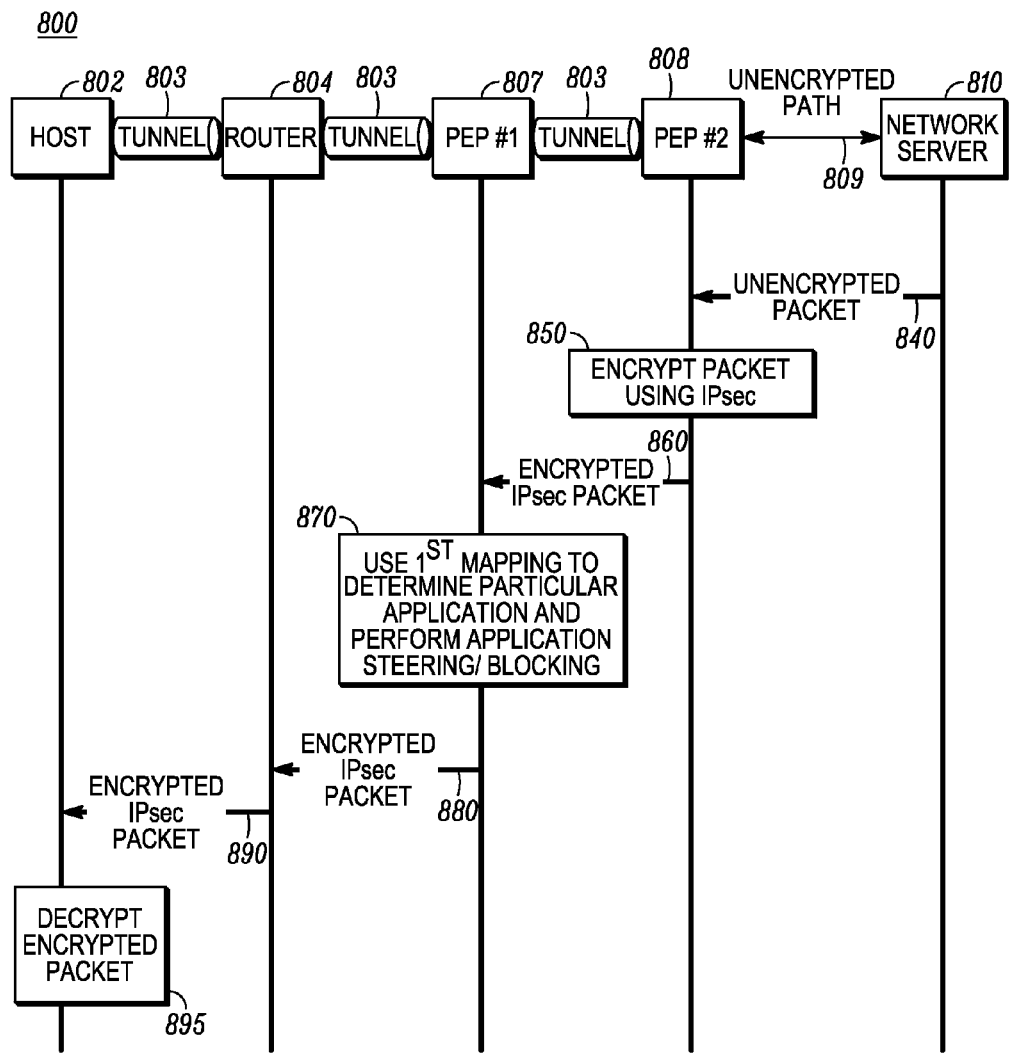
FIG. 8 is a message flow diagram illustrating an exemplary process for enabling application steering and/or application blocking to an outbound communication in secure networks in accordance with some embodiments of the invention.

FIG. 8 is a flow diagram illustrating an exemplary process 800 for enabling application steering and/or application blocking to an encrypted outbound communication in secure networks in accordance with some embodiments of the invention. In this particular example, it is assumed that the network application server 810 is transmitting packets to the mobile host 802. In process 800, a first Policy Enforcement Point (PEP #1) 807 wants to perform application steering/blocking on encrypted outbound packets sent from the network application server 810 to the host 802. As will be described below, packet(s) communicated from the network application server 810 are encrypted at a second policy enforcement point (PEP#2) 808 using IPsec. The first Policy Enforcement Point (PEP #1) 807, applies its application steering/routing policies to the encrypted packets which are originated from the network application server 810.

When the network application server 810 wants to transmit a packet in the outbound direction to another network entity (i.e., the host 802), at message 840, the network application server 810 sends the packet to the second Policy Enforcement Point (PEP #2) 808 over the unencrypted path 809. In this embodiment, the second Policy Enforcement Point (PEP #2) 808 is one tunnel endpoint and the host 802 is the other tunnel endpoint. In an alternative embodiment, the network application server 810 could serve as one tunnel endpoint and can therefore generate mapping information which it in turn provides to other network entities such as the second Policy Enforcement Point (PEP #2) 808, the first Policy Enforcement Point (PEP #1) 807, etc.

At block 850, the second Policy Enforcement Point (PEP #2) 808 then uses IPsec to encrypt the packet and appends an IPsec header to the encrypted packet. The IPsec packet comprises an unencrypted IPsec header appended to the encrypted packet. At message 860, the IPsec packet transmitted by the second Policy Enforcement Point (PEP #2) 808 is received by the first Policy Enforcement Point (PEP #1) 807.

At this point, the first Policy Enforcement Point (PEP #1) 807 has the mapping information which it obtained, for example, from the host 802 via the router 804 and/or from the second Policy Enforcement Point (PEP #2) 808. When the first Policy Enforcement Point (PEP #1) 807 receives the IPsec packet, at block 870, the first Policy Enforcement Point (PEP #1) 807 can examine the unencrypted IPsec header, determine the SPI from the unencrypted IPsec header, and use the mapping information and the SPI to determine the application (or application identifier) that the encrypted packet is associated with since the IPsec header, which includes the SPI, is not encrypted. Because the first Policy Enforcement Point (PEP #1) 807 can determine the particular application the encrypted packet is associated with, the first Policy Enforcement Point (PEP #1) 807 can perform its application steering/blocking policies.

Using conventional techniques, this determination could not happen since the port number is part of the encrypted packet and is therefore also encrypted (e.g., the first Policy Enforcement Point (PEP #1)) 807 can not rely on the port number to perform application steering/blocking).

The first Policy Enforcement Point (PEP #1) 807 transmits or forwards the IPsec packet to the router 804 at message 880, and the router 804 receives the IPsec packet. At message 890, the router 804 can transmit the IPsec packet to the host 802.

When the host 802 receives the IPsec packet from the router 804, at block 895, the host 802 uses keys it shares with the network application server 810 to decrypt the encrypted packet and obtain the unencrypted packet which is originally sourced from the network application server 810.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for application steering or blocking transmitted encrypted data from a source tunnel endpoint to a target tunnel endpoint over an encrypted tunnel in accordance with application steering or blocking policies, the method comprising:
   at a source tunnel endpoint of the encrypted tunnel, mapping a first Security Parameter Index (SPI) and a second SPI to a first application identifier to generate first mapping information, the first application identifier identifying the first application that is generating the encrypted data and that, in combination with the application steering or blocking policies, is used to identify a particular interface for further transmitting encrypted data generated by the first application towards the target tunnel endpoint;
   communicating the first mapping information from the source tunnel endpoint to an intermediate network entity for use by the intermediate network entity, in combination with the application steering or blocking policies, in identifying the particular interface for further transmitting the encrypted data generated by the first application towards the target tunnel endpoint; and
   concatenating an unencrypted header including the first SPI with a first encrypted data payload generated by the first application to create a first communications packet; and
   the source tunnel endpoint transmitting the first communications packet to the target tunnel endpoint over the encrypted tunnel via the intermediate network entity and in accordance with the application steering or blocking policies associated with the first application.

2. The method according to claim 1, wherein the first SPI comprises an inbound SPI and wherein the second SPI comprises an outbound SPI.

3. The method according to claim 1, further comprising:
   the intermediate network entity extracting the first SPI from the unencrypted header of the first communications packet; and
   the intermediate network entity using the first SPI and the first mapping information previously received to determine the first application identifier and to identify the first application associated with the first application identifier;
   the intermediate network entity using the identity of the first application and the application steering or blocking policies to determine the particular interface necessary for further transmitting the first encrypted data to the target tunnel endpoint over the encrypted tunnel; and
   the intermediate network entity transmitting the first encrypted data to the target tunnel endpoint using the determined particular interface.

4. The method according to claim 3, wherein the determined particular interface comprises one of an 802.11 wireless interface, a cellular wireless interface, a satellite wireless interface, and a wired interface.

5. The method according to claim 4, wherein each of the 802.11 wireless interface, cellular wireless interface, satellite wireless interface, and wired interface is associated with a different internet protocol (IP) address for further transmitting the first communications packet towards the target endpoint.

6. The method according to claim 3, wherein the source tunnel endpoint comprises a mobile host, and wherein the network entity comprises a mobile router.

7. The method according to claim 3, wherein the source tunnel endpoint comprises a Policy Enforcement Point (PEP).

8. The method according to claim 7, wherein the intermediate network entity comprises another Policy Enforcement Point (PEP).

9. The method according to claim 8, wherein the intermediate network entity comprises a mobile router.

10. The method according to claim 1, wherein the intermediate network entity determines the first application identifier from the SPI and uses the first application identifier at the intermediate network entity to enable blocking policies that prevent one or more interfaces from being used to transmit packets which originate from a particular application.

11. The method according to claim 1, wherein communicating the first mapping information from the source tunnel endpoint to the intermediate network entity enables the intermediate network entity to provide different levels of QoS on encrypted data from the source tunnel endpoint dependent on the SPI parameter included in a transmitted packet so that different applications running on the source tunnel endpoint are able to have different levels of QoS.

12. The method according to claim 1, further comprising the source tunnel endpoint negotiating for each application a unique security association (SA) containing the mapping directly with a policy enforcement point of a home network of the source tunnel endpoint prior to communicating the first mapping information from the source tunnel endpoint to the intermediate network entity, the source tunnel endpoint communicating with the policy enforcement point through the intermediate network entity after the source tunnel endpoint negotiated with the policy enforcement point.

13. A system for enabling application steering or blocking transmitted encrypted data from a source tunnel endpoint to a target tunnel endpoint over an encrypted tunnel in accordance with configured application steering or blocking policies, the system comprising:
   a source tunnel endpoint node comprising a first processor, first memory, and first transceiver, the first processor configured to:
   associate a first Security Parameter Index (SPI) and a second SPI to a first application identifier to generate first mapping information, the first application identifier identifying the first application that is generating the encrypted data and that, in combination with the application steering or blocking policies, is used to identify a particular interface for further transmitting encrypted data generated by the first application towards the target tunnel endpoint;
   communicate, via the first transceiver, the first mapping information to an intermediate network entity for use by the intermediate network entity, in combination with the application steering or blocking policies, in identifying the particular interface for further transmitting the encrypted data generated by the first application towards the target tunnel endpoint;
   concatenate an unencrypted header including the first SPI with a first encrypted data payload generated by the first application to create a first communications packet; and
   transmit, via the first transceiver, the first communications packet to the target tunnel endpoint over the encrypted tunnel via the intermediate network entity and in accordance with the application steering or blocking policies associated with the first application; and
   the intermediate network entity, coupled to the source tunnel endpoint over the encrypted tunnel, and comprising a second processor, second transceiver, and second memory, the second processor configured to:
   receive, via the second transceiver, the first mapping information and store the first mapping information in the second memory;
   receive, via the second transceiver, the first communications packet;
   extract the first SPI from the unencrypted header of the first communications packet,
   use the first SPI and the first mapping information to determine the first application identifier and to identify the first application associated with the first application identifier;
   use the identity of the first application and application steering or blocking policies configured at the intermediate network entity to determine the particular interface necessary for further transmitting the first encrypted data to the target tunnel endpoint over the encrypted tunnel; and
   transmit, via the second transceiver, the first encrypted data towards the target tunnel endpoint using the determined particular interface.

14. The system according to claim 13, wherein the first SPI comprises an inbound SPI and the second SPI comprises an outbound SPI.

15. The system according to claim 13, wherein the source tunnel endpoint comprises a mobile host, and wherein the intermediate network entity comprises a mobile router.

16. The system according to claim 13, wherein the intermediate network entity comprises a router, and wherein the selected interface is used to transmit the first communications packet from the router to another network entity on a path towards the target tunnel endpoint.

17. The system according to claim 13, wherein the source tunnel endpoint comprises a Policy Enforcement Point (PEP).

18. The system according to claim 17, wherein the intermediate network entity comprises another Policy Enforcement Point (PEP).

19. The system according to claim 13, wherein the determined particular interface comprises one of an 802.11 wireless interface, a cellular wireless interface, a satellite wireless interface, and a wired interface.

20. The system according to claim 19, wherein each of the 802.11 wireless interface, cellular wireless interface, satellite wireless interface, and wired interface is associated with a different internet protocol (IP) address for further transmitting the first communications packet towards the target tunnel endpoint.

21. A source tunnel node configured to communicate with a target tunnel node via an intermediate network entity over an encrypted tunnel supporting application steering or blocking of encrypted data, the source tunnel node comprising:
   a memory configured to store a unique Security Parameter Index (SPI) for each application identifier, each application identifier identifying a particular application that is generating encrypted data at the source tunnel node and that, in combination with application steering or blocking policies, may be used to identify a particular interface necessary for transmitting encrypted data generated by a corresponding application towards the target tunnel node;
   a processor configured to associate a first Security Parameter Index (SPI) and a second SPI to a first application identifier and to generate first mapping information, the first application identifier identifying a first application that is generating first encrypted data at the source tunnel node and that, in combination with the application steering or blocking policies, may be used to identify a particular interface necessary for further transmitting encrypted data generated by a first application towards the target tunnel node;
   a transmitter configured to transmit the first mapping information to the intermediate network entity for use by the intermediate network entity, in combination with the application steering or blocking policies in identifying the particular interface for further transmitting the encrypted data generated by the first application towards the target tunnel endpoint,
   the processor further configured to concatenate an unencrypted header including the first SPI with a first encrypted data payload generated by the first application to create a first communications packet; and
   the transmitter further configured to transmit the first communications packet towards the target tunnel node over the encrypted tunnel via the intermediate network entity, and in accordance with the application steering or blocking policies associated with the first application.

22. The source tunnel node according to claim 21, wherein the first SPI comprises an inbound SPI and the second SPI comprises an outbound SPI.

23. The source tunnel node according to claim 21, wherein the source tunnel node comprises a mobile host, and wherein the intermediate network entity comprises a mobile access point.

24. The source tunnel node according to claim 21, wherein the source tunnel node comprises a Policy Enforcement Point (PEP), and wherein the intermediate network entity comprises another Policy Enforcement Point (PEP).

25. An intermediate network entity for forwarding encrypted data payloads received from a source tunnel endpoint to a target tunnel endpoint over an encrypted tunnel, the intermediate network entity comprising:
 a memory which stores first mapping information from a source tunnel endpoint, wherein the first mapping information comprises at least a first Security Parameter Index (SPI) and a second Security Parameter Index (SPI) associated with a first application identifier, the first application identifier identifying a particular application that is generating encrypted data at the source tunnel node and that, in combination with application steering or blocking policies, may be used to identify a particular interface necessary for further transmitting encrypted data payloads generated by the first application to the target tunnel node;
 a receiver configured to receive a first encrypted communications packet from the source tunnel endpoint over the encrypted tunnel, wherein the first communications packet comprises a first encrypted data payload and a first unencrypted header including the first SPI; and
 a processor configured to:
  extract the first SPI from the unencrypted header, and to determine the first application identifier based on the first SPI and the previously received first mapping information, and to identify a first application associated with the first application identifier, and
  use the identity of the first application and the application steering or blocking policies configured at the intermediate network entity to determine the particular interface necessary for further transmitting the first encrypted data payload to the target tunnel endpoint over the encrypted tunnel; and
 a transmitter configured to transmit the first encrypted data payload towards the target tunnel endpoint using the determined particular interface.

26. The intermediate network entity according to claim 25, wherein the first SPI comprises an inbound SPI and the second SPI comprises an outbound SPI.

27. The intermediate network entity according to claim 25, wherein the intermediate network entity comprises a mobile router or a Policy Enforcement Point (PEP).

28. Tile intermediate network entity according to claim 25, wherein the determined particular interface comprises one of an 802.11 wireless interface, a cellular wireless interface, a satellite wireless interface, and a wired interface.

29. The intermediate network entity according to claim 28, wherein each of the 802.11 wireless interface, cellular wireless interface, satellite wireless interface, and wired interface is associated with a different internet protocol (IP) address for further transmitting the first communications packet towards the target tunnel endpoint.

* * * * *

UNITED STATES PATENT AND TRADEMARK OFFICE
CERTIFICATE OF CORRECTION

PATENT NO. : 8,677,114 B2
APPLICATION NO. : 11/619878
DATED : March 18, 2014
INVENTOR(S) : Lewis et al.

It is certified that error appears in the above-identified patent and that said Letters Patent is hereby corrected as shown below:

On the title page, item 56, under "OTHER PUBLICATIONS", in Column 1, Line 1, delete "Aug. 29, 2008." and insert -- Sep. 29, 2008. --, therefor.

In the specification

In Column 4, Line 25, delete "host 1110." and insert -- host 110. --, therefor.

In Column 8, Line 40, delete "node 400" and insert -- node 410 --, therefor.

In Column 9, Line 20, delete "antenna 406" and insert -- antenna 406. --, therefor.

In Column 10, Line 62, delete "an Security" and insert -- a Security --, therefor.

In Column 14, Line 48, delete "807," and insert -- 807 --, therefor.

In the claims

In Column 20, Line 23, in Claim 28, delete "Tile intermediate" and insert -- The intermediate --, therefor.

Signed and Sealed this
Ninth Day of August, 2016

Michelle K. Lee
*Director of the United States Patent and Trademark Office*